July 4, 1967  E. J. LOWES  3,328,984
WASHING MACHINES AND CONTROL SYSTEMS THEREFOR
Filed Jan. 28, 1966
12 Sheets-Sheet 1
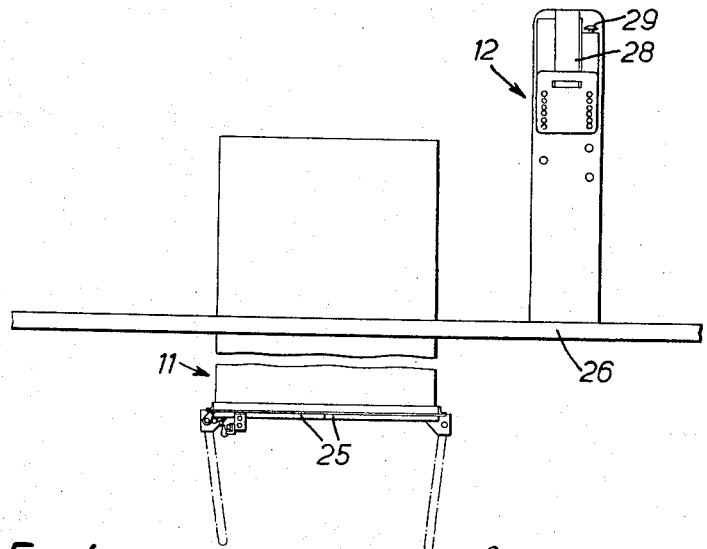
FIG. 1.
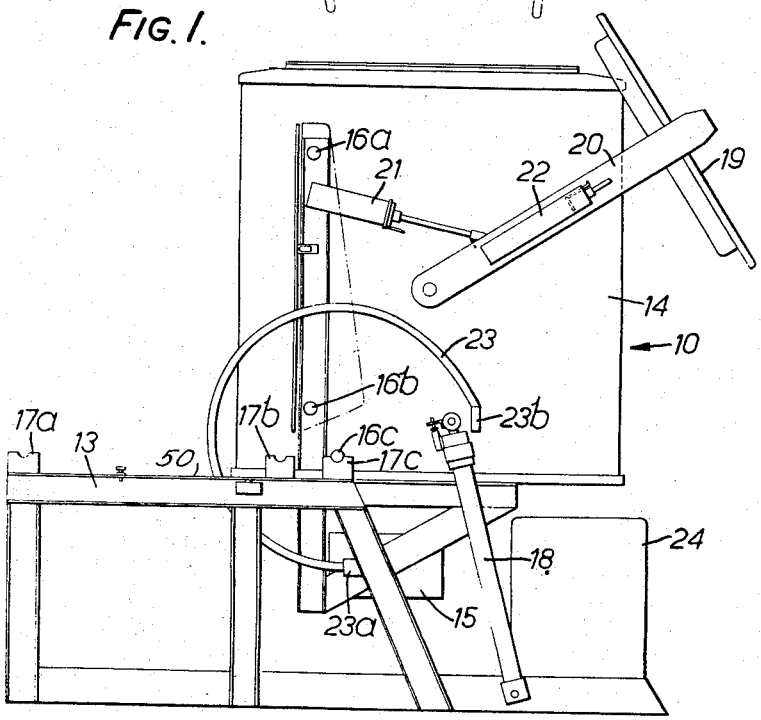
Edward John Lowes
INVENTOR
BY
Lawrence E. Laubscher
ATTORNEY July 4, 1967  E. J. LOWES  3,328,984
WASHING MACHINES AND CONTROL SYSTEMS THEREFOR
Filed Jan. 28, 1966  12 Sheets-Sheet 2

July 4, 1967  E. J. LOWES  3,328,984
WASHING MACHINES AND CONTROL SYSTEMS THEREFOR
Filed Jan. 28, 1966  12 Sheets-Sheet 3

Edward John Lowes
INVENTOR

BY
Lawrence C. Laubscher
ATTORNEY

July 4, 1967  E. J. LOWES  3,328,984
WASHING MACHINES AND CONTROL SYSTEMS THEREFOR
Filed Jan. 28, 1966  12 Sheets-Sheet 4

Edward John Lowes
INVENTOR

BY
Lawrence E. Laubscher
ATTORNEY

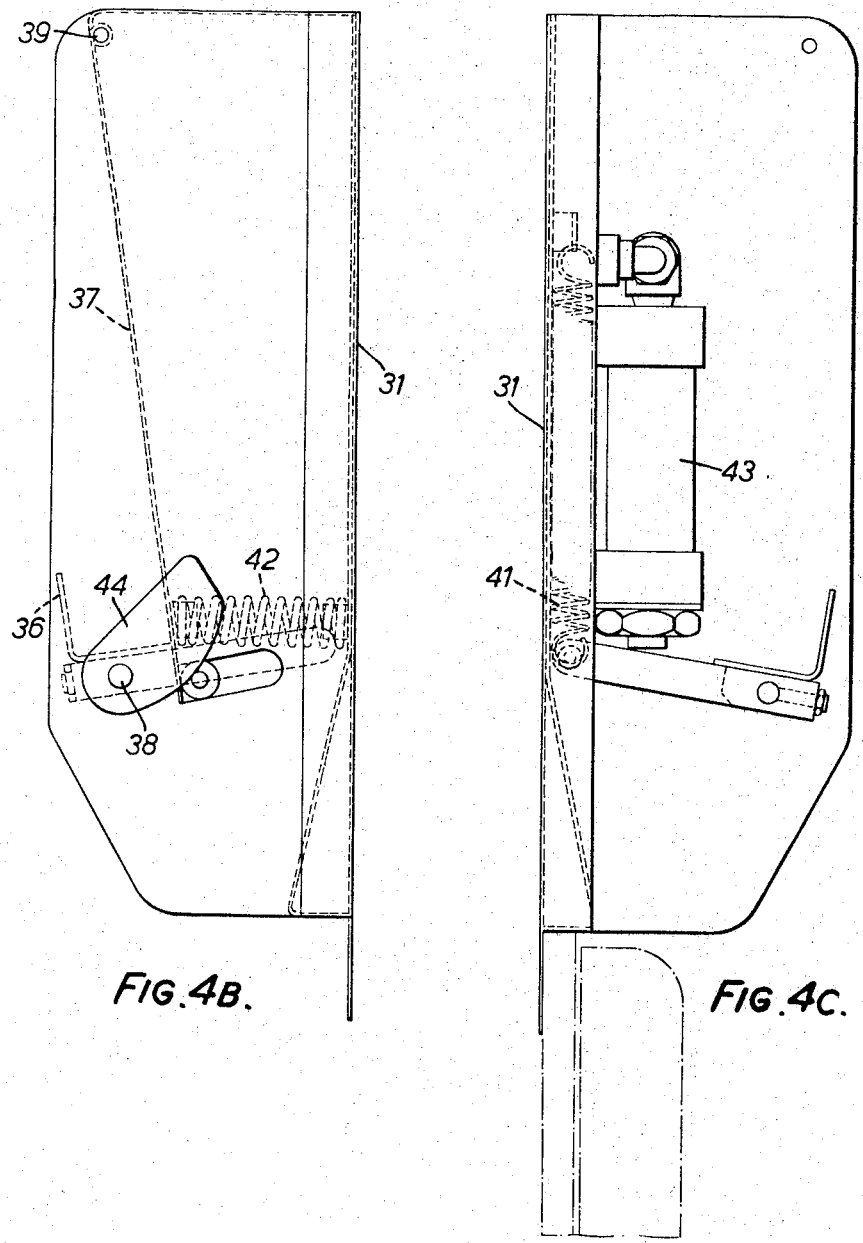

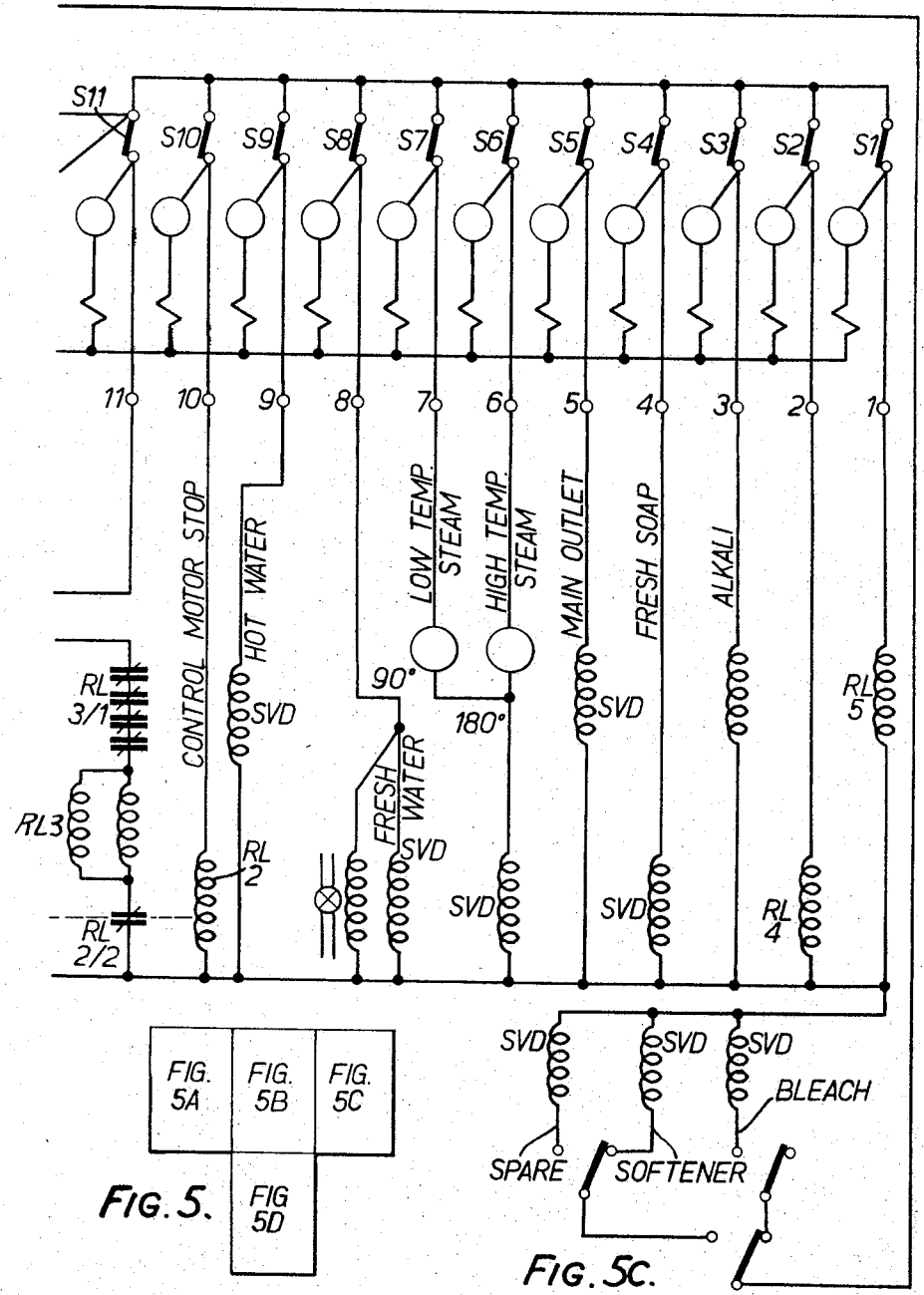

July 4, 1967    E. J. LOWES    3,328,984
WASHING MACHINES AND CONTROL SYSTEMS THEREFOR
Filed Jan. 28, 1966    12 Sheets-Sheet 10

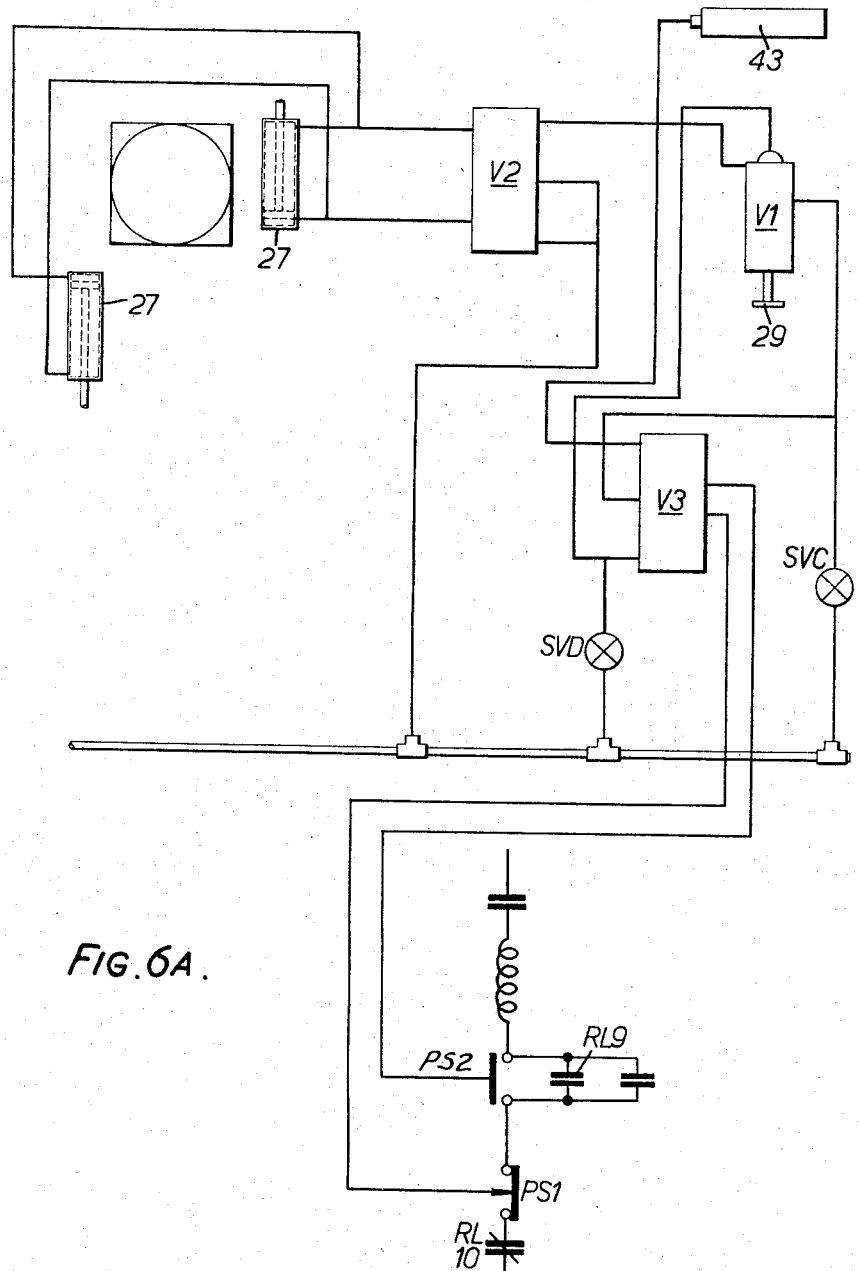

United States Patent Office 3,328,984
Patented July 4, 1967

3,328,984
WASHING MACHINES AND CONTROL
SYSTEMS THEREFOR
Edward John Lowes, Albourne, England, assignor to
James Armstrong & Company Limited
Filed Jan. 28, 1966, Ser. No. 523,600
7 Claims. (Cl. 68—12)

The present invention relates to washing machines.

According to the invention there is provided a washing machine comprising a drum rotatable about the drum axis on a support which is mounted by pivot means on a base so that the drum can be pivoted into substantially upright and horizontal positions, the pivot means comprising a first disengageable pivot means on which the support pivots about a first horizontal axis between the substantially upright position and an intermediate position, and a second disengageable pivot means on which the support pivots about a second horizontal axis between the intermediate and substantially horizontal positions.

A washing machine embodying the invention will now be described, by way of example, with reference to the drawings filed with the provisional specification, wherein:

FIGURE 1 is an elevation of the washing machine, positioned for loading;

FIGURES 4A, 4B and 4C are front and two side elevations respectively of the control card feeder unit in the control station of FIGURES 1, 3A, 3B and 3C;

Figure 2:
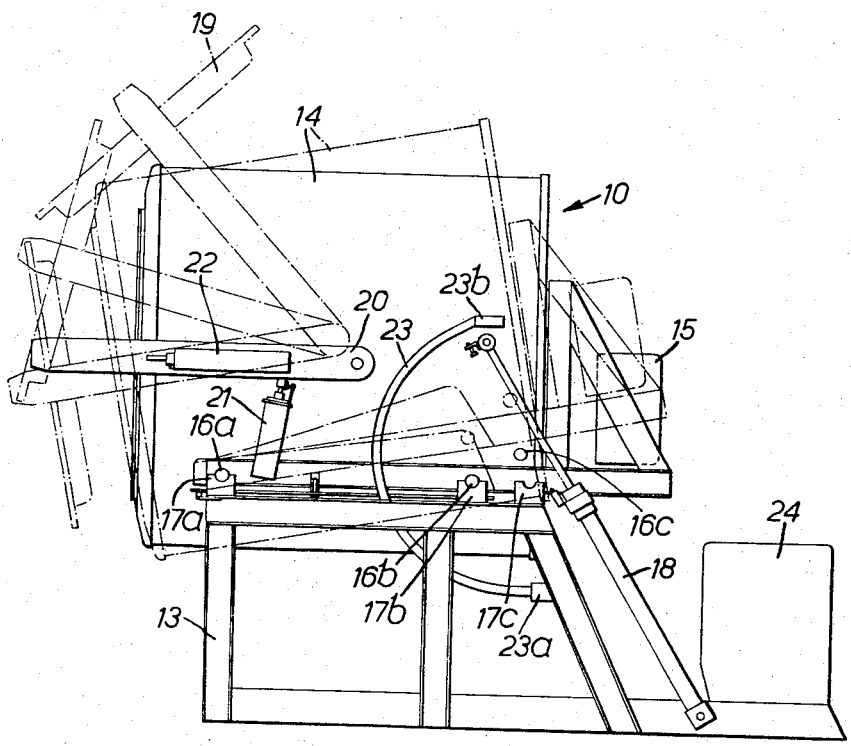
FIGURE 2 is an elevation of the washing machine unit, the full lines showing the machine unit in horizontal position during the washing operation.

Shown in FIGURE 1 is a washing machine unit 10, a hopper 11 for loading washing into the washing machine unit, and a control station 12.

The washing machine unit 10 comprises a base 13 and a casing 14. A drum (not visible) is supported for rotation inside the casing 14 by means of a bearing in a housing 15, so that the drum which contains the washing, normally rotates about a horizontal axis with casing 14 in the position shown in full lines in FIGURE 2.

The casing 14 is provided with three trunnions 16a, 16b and 16c on each side, and the base 13 with three co-operating pairs of half bearings 17a, 17b and 17c for supporting the casing with the drum. A pair of hydraulic jacks 18 are arranged one on each side of the casing and pivotally mounted on the base 13 to raise the casing into the upright or vertical position shown in FIGURE 1 for loading, to tip the casing to the horizontal position for washing and to tip the casing further, approximately 10° down from the horizontal, to the position shown in dotted lines in FIGURE 2, for unloading.

It will be seen that casing 14 in the vertical position is pivoted on trunnions 16c. Upon lowering, the casing initially pivots around trunnions 16c, until trunnions 16b engage half bearings 17b, at a position intermediate the upright and horizontal positions. Thereafter the casing pivots on trunnions 16b until it reaches the horizontal position. This provides a far greater leverage, and hence control by jacks 18, and avoids uncontrolled falling of the machine into the horizontal position. Upon tipping forward, casing 14 pivots about trunnions 16a. Thus the advantages of weight distribution achieved in the horizontal position by supporting the casing on four trunnions 16a and 16b are combined with the ease with which the casing is raised and lowered between the vertical and horizontal positions, by means of trunnions 16b and 16c.

An end cover 19 for the casing is mounted on a pair of arms 20 which are pivotable with respect to the casing by a pair of pneumatic jacks 21. The cover 19 is movable along the arms 20 by a further pair of pneumatic jacks 22.

A flexible electric conduit 23 carries electric power from a main control panel 24 to an electric motor (not shown) on bearing housing 15, for rotating the drum. The conduit 23 is connected between junction boxes 23a and 23b on the base 13 and casing 14 respectively.

Various limit switches, which will be described later, are arranged on the machine to provide automatic sequencing and control of operations. Conduit 23 connects those mounted on the casing 14 or arms 22 to the control panel 24.

The hopper 11 is dimensioned to hold the correct quantity of dry washing for one loading of the washing machine unit, say 100 lbs. or 200 lbs. of dry cotton clothes or their equivalent in size. Two flaps 25 are arranged to open to drop the clothes down a retractable nylon chute (not shown) into the washing machine unit. The hopper is loaded by an operator standing on an upper floor 26 and conveniently the hopper may serve to store sorted soiled washing until the washing machine unit is ready for it.

The control station 12 adjacent the hopper is arranged to be fed with an individual programme card 28 to control the washing operations.

It is a feature of the system that the operator may load the hopper and insert the desired programme card in control station 12 before the washing machine unit has finished its previous load. All the operator has to do after loading the hopper and inserting the card is to press a button 29, which will be referred to later. The washing machine will automatically load the new washing, carry out the washing cycle prescribed by the programme card and then unload the washing again.

Before describing the washing machine, and particularly the control station 12 and the electrical and pneumatic control circuits, in any greater detail, a brief description will be given of a washing cycle.

The cycle commences with the washing machine unit 10 in the position shown in FIGURE 1, with the cover 19 off and the hopper flaps 25 closed.

The operator fully loads the hopper 11, inserts the desired programme card 28 into control station 12 and presses button 29.

The remainder of the cycle is automatic.

The washing machine drum commences to rotate, and the flaps 25 open to the dotted positions shown in FIGURE 1. Simultaneously the card 28 is fed through control station 12 and causes flaps 25 to close after the washing is loaded.

The cover 19 pivots on arms 20 to the front of the casing by means of jacks 21. Then the casing pivots to the horizontal position shown in FIGURE 2 and the cover 19 simultaneously retracts by jacks 22 to close the casing.

Then the washing cycle prescribed by programme card 28 is carried out.

At the end of the washing cycle, after emptying the liquid, the cover 19 is extended and pivoted upwards to the position shown dotted in FIGURE 2 and the casing 14 tips forward, with the drum still rotating, to tip the washing out on to a "wet wash" conveyor (not shown). Where a number of machines are included in this system, this runs continuously in front of all the washing machines. Interlock means, which will be described later, ensure that only one of the machines unloads on to the conveyor at a time.

Thereafter the drum tips up into the vertical position shown in FIGURE 1, still with cover 19 open, in readiness for another load. If there is no load waiting, the drum motor then stops. Otherwise, it remains running.

Figures 3A, 3B:
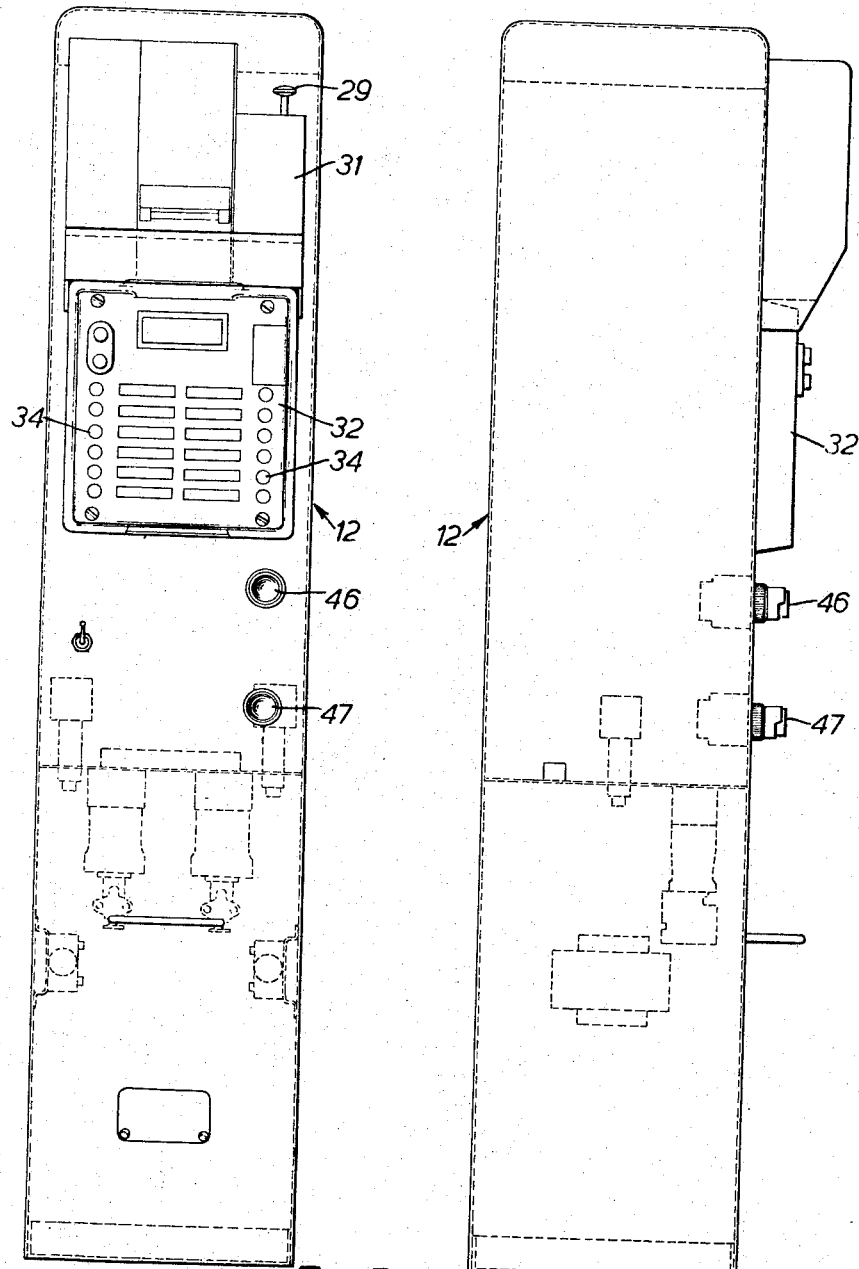
FIGURES 3A, 3B and 3C are front, side and rear elevations respectively of the control station of FIGURE 1.
Figure 3C:
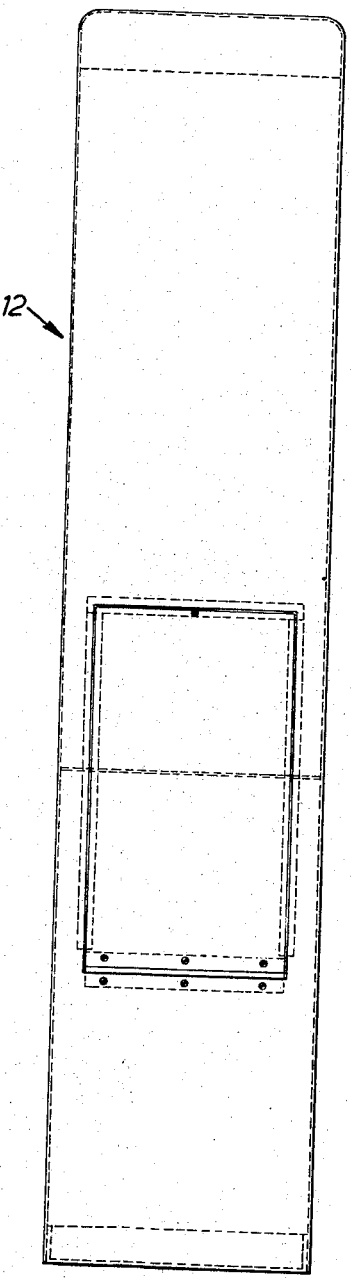

Referring to FIGURES 3A, 3B and 3C, the control station 12 comprises a programme card feed unit 31 arranged above a card sensing unit 32. The programme card 28 (FIGURE 1) is fed vertically downwards in a guide 33, and has twelve side-by-side ribs (not shown) operating twelve micro-switches in the sensing unit 32 to control the washing unit. Twelve indicator lights 34 are arranged to indicate which switches are operated at any instant.

Figure 4A:
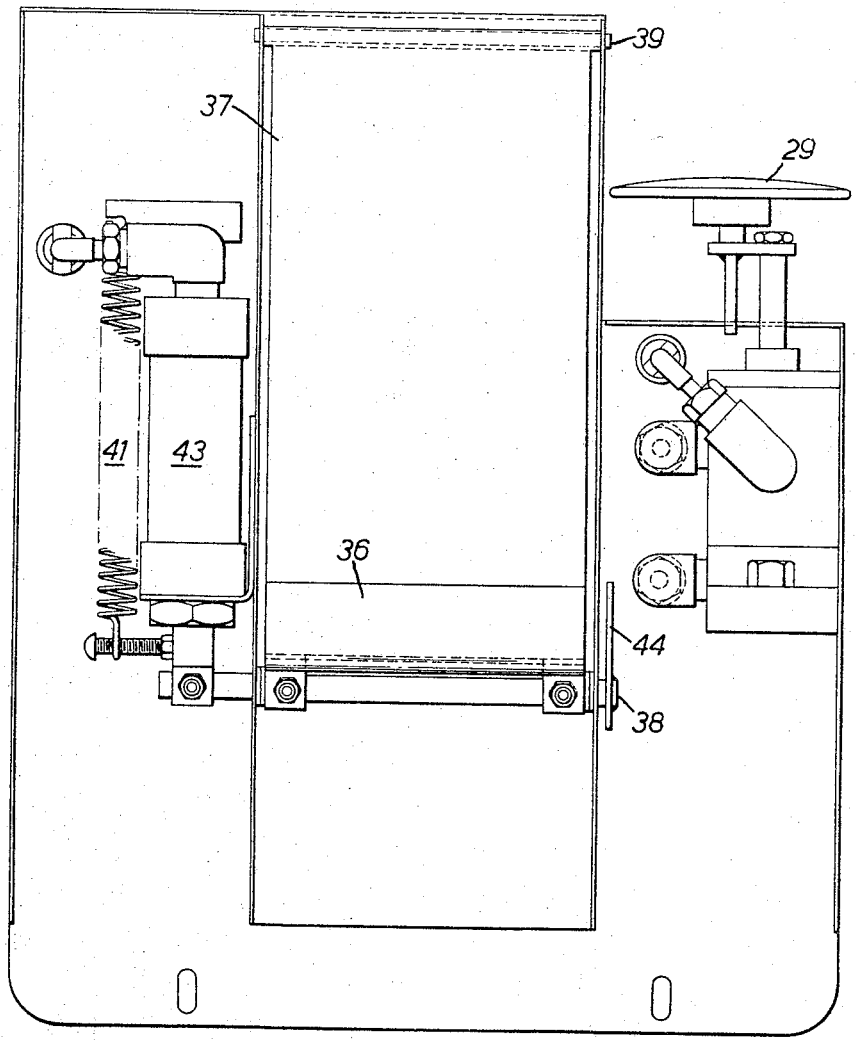

Referring to FIGURES 4A, 4B and 4C, the programme card feed unit 31 is provided with the already mentioned control button 29 and with a mechanism for feeding the programme card at a suitable instant to the card sensing unit 32 (FIGURE 3A etc.).

Two members 36 and 37 are pivoted at 38 and 39 respectively to retain the programme card (shown in FIGURE 1) initially and eventually to release the card to drop into the card sensing unit. A spring 41 biases member 36 anticlockwise and another spring 42 biases member 37 to the left as seen in FIGURE 4B. A pneumatic device 43 is operative to pivot member 36 clockwise (FIGURE 4B) to release the programme card, and a cam 44 on member 36 pivots member 37 to the right.

The card is provided with teeth along its length, which engage a sprocket (not visible), whereby the card is driven through the card sensing unit 32 (FIGURES 3A, 3B and 3C) by an electric motor M (FIGURE 5) at two speeds, namely, a fast speed at the beginning and at the end, when it is ejected from the card sensing unit, and a slow speed in the middle, when it is controlling the washing cycle.

Relays and various control circuits for the washing system are housed in the lower portion of control station 12. Start and stop press buttons 46 and 47 respectively are also mounted on the control station.

Figure 5A:
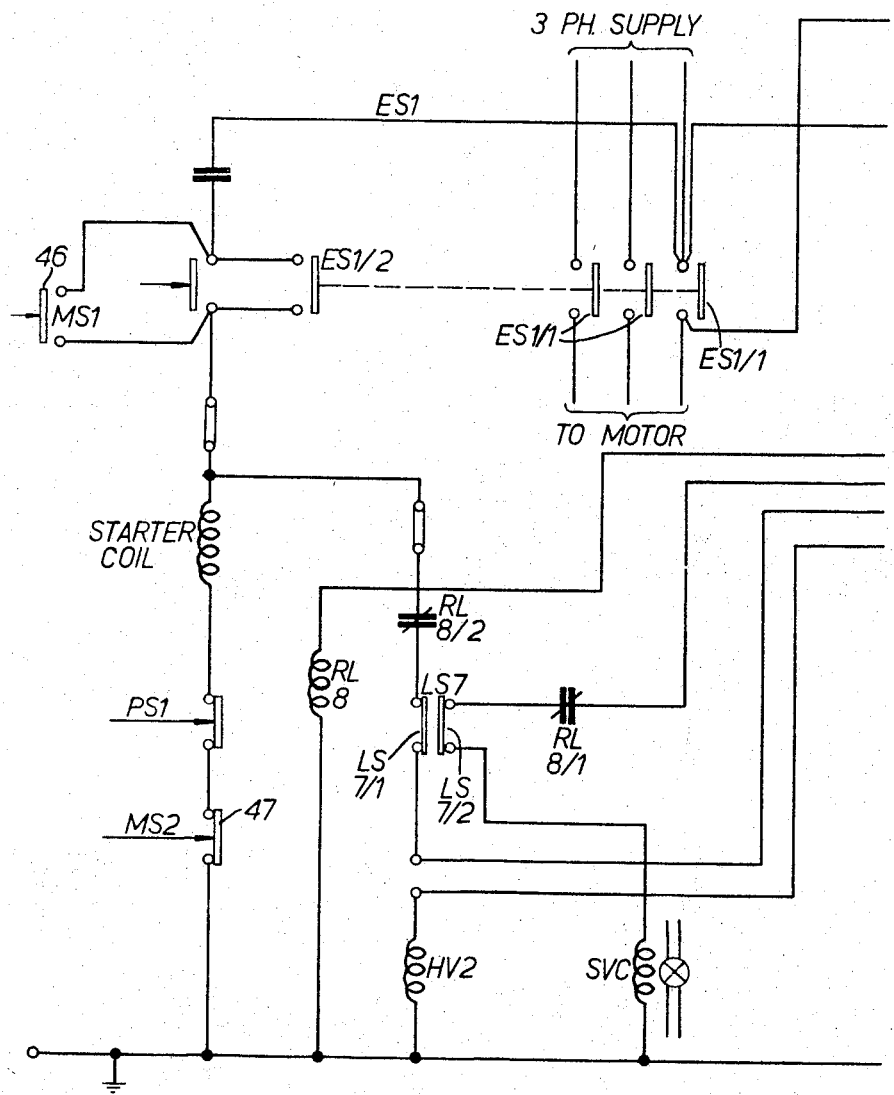
FIGURE 5 is a circuit diagram of the electrical circuit of the system.
Figure 5B:
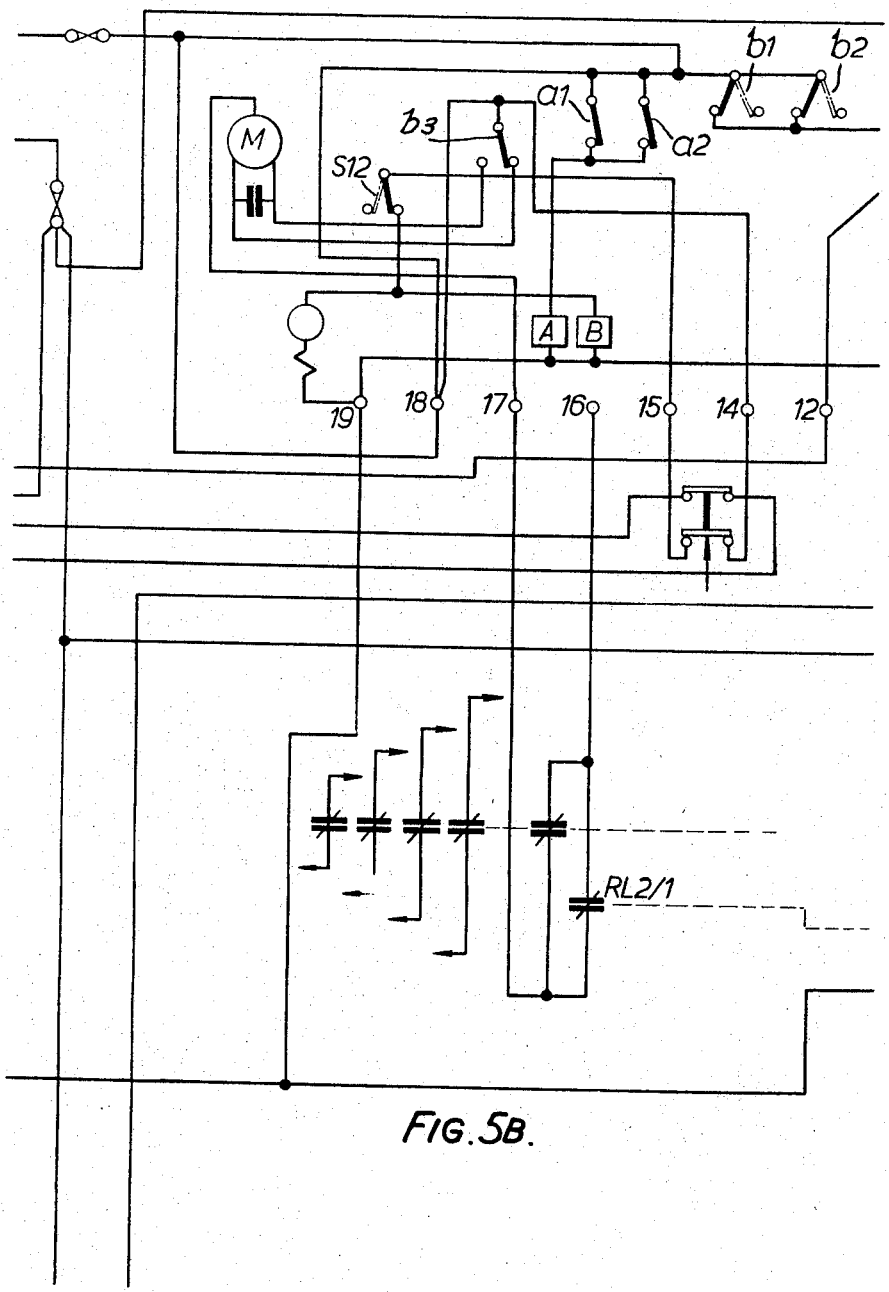
Figure 5D:
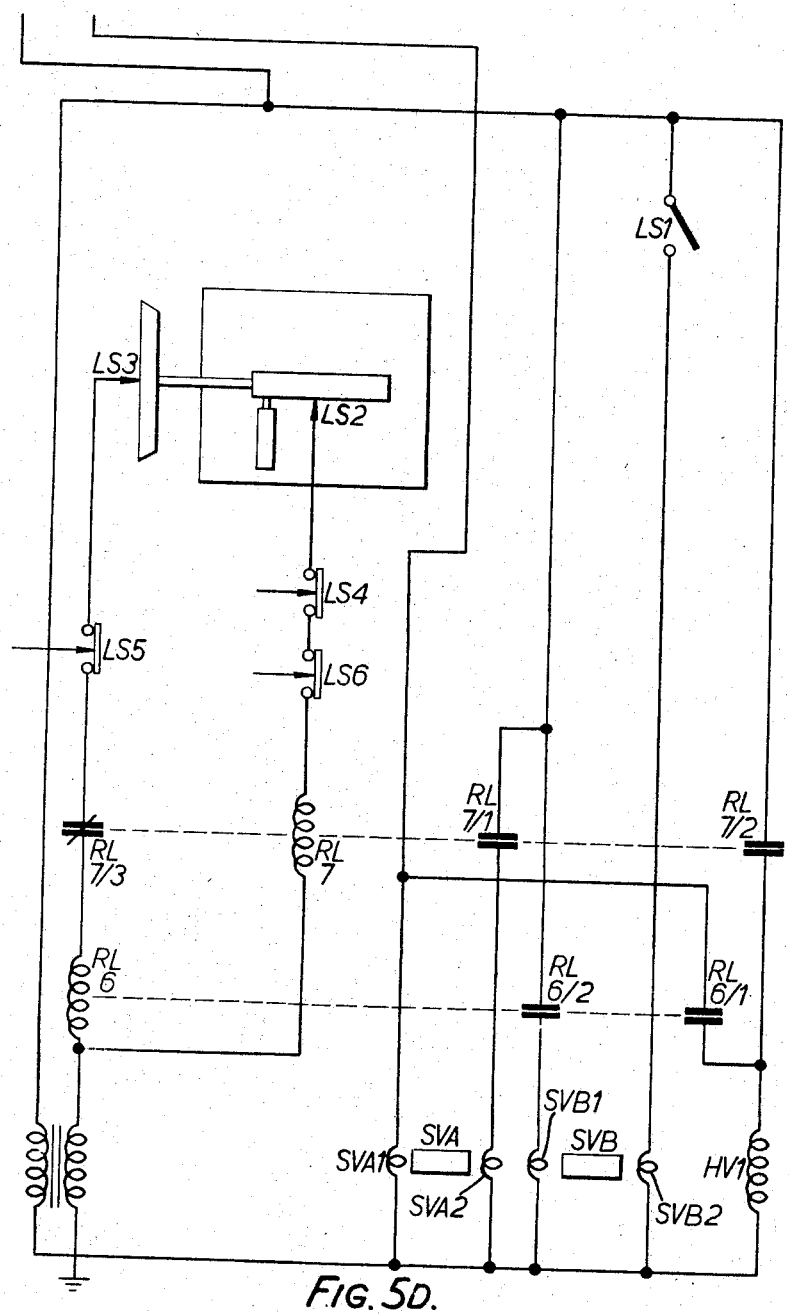

Referring to FIGURE 5, there is provided an electrical starter solenoid ES1, a manual "start" switch MS1 operable by button 46, a manual "stop" switch MS2 operable by button 47, and a pressure stop switch PS1 responsive to a fall in the air pressure in the pneumatic control system to stop the washing unit.

The motor M is arranged to feed the programme card through the card sensing unit 32 at two speeds. Switches S1 to S12 are the previously referred-to micro-switches operated by the programme card. Switches S1 to S11 are normally closed and can be opened by ribs on the card, whilst switch S12 is normally open and is closed by a rib on the card.

Of the limit switches mentioned above, switch LS1 is closed upon closure of the hopper flaps 25, switch LS2 makes a connection to earth when the cover 19 is pivoted in front of casing 14, switch LS3 makes an earth connection with cover 19 fully extended away from casing 14. Switch LS4 opens when the casing 14 is horizontal or tipped forward. Switch LS4 is connected to guard rails 50 (FIGURE 1) and opens to stop descent of casing 14 in the event of an obstruction. Switch LS5 closes when casing 14 is horizontal or tipped forward and switch LS6 closes when the casing is vertical. Switch LS7, in the upper portion of FIGURE 5 near the left, closes left-hand contacts LS7/1 with casing 14 in any position except the vertical, when right-hand contacts LS7/2 are closed instead.

Figure 6B:
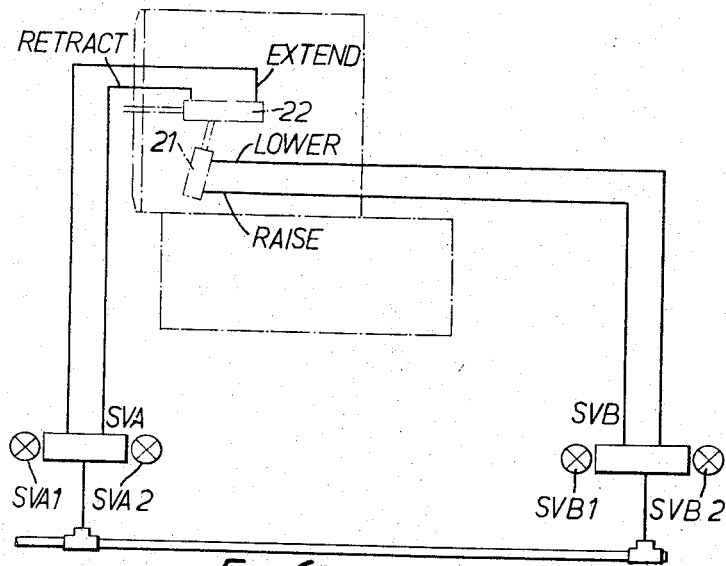
FIGURES 6A and 6B are circuit diagrams of pneumatic control circuits.

The pneumatic jacks 22 are operable to extend and retract cover 19 by means of a double acting solenoid valve SVA (FIGURES 5 and 6B) and jacks 21 are operable by means of a similar valve SVB.

Referring to FIGURE 6A, the operating button 29 controls a pneumatic valve V1. A further pneumatic valve V2 controls air to pneumatic jacks 27 which move the hopper flaps 25. Another pneumatic valve V3 operates switches PS1 (FIGS. 5 and 6A) and PS2 (FIG. 6A), to stop and start the drum motor respectively. Solenoid valve SVC (FIGURES 5 and 6A) is operable by closure of contacts LS7/2. Solenoid valve SVD is operable to reset button 29 and valve V3 by closure of switch S8 (FIGURE 5).

A cycle of the washing machine will now be described with reference mainly to FIGURES 5 and 6A.

The cycle commences, as already mentioned, with the casing 14 vertical as in FIGURE 1, but with flaps 25 closed and cover 19 open. In this position contacts LS1, LS2, LS5 and LS7/1 are open and contacts LS3, LS4, LS6 and LS7/2 are closed. With washing in hopper 11 and a programme card inserted in card feed unit 31, depression of button 29 operates valve V1 to open the hopper flaps through valve V2 and jacks 27 and to release the programme card to drop to the card sensing unit 32 by means of cylinder 43.

The programme card is initially fed at high speed by motor M, and opens switches S1 to S11, whilst closing switch S12 to operate relay B. Contact $b3$ of relay B changes over to switch motor M to slow speed and contacts $b1$ and $b2$ close to operate relay RL8 and close the flaps by opening contacts RL8/1 and thus releasing solenoid valve SVC. Valve V2 (FIGURE 6A) is provided with a continuous pilot pressure tending to close flaps 25, which becomes operative upon release of valve SVC.

Closure of flaps 25 closes switch LS1 to operate solenoid valve SVB2 (FIGURES 5 and 6B) and operate jacks 21 to lower cover 19. When cover 19 is fully lowered, switch LS2 is closed to operate relay RL7, closing its contacts RL7/1 to operate solenoid valve SVA 2 (FIGURES 5 and 6B) and thereby retract cover 19. Simultaneously, contacts RL7/2 close, operating hydraulic valve HV1 to lower casing 14 to the horizontal, and contacts RL7/3 open, with no effect since switch LS5 is open.

When casing 14 reaches the horizontal position, switch LS4 opens to release relay RL7, contacts RL7/1 and RL7/2 opening to release valves SVA2 and HV1 respectively. Closure of contacts RL7/3 has no effect, since switch LS3 is open.

Thereafter switches S1 to S9 are operated in the manner prescribed by the programme card to effect the desired washing cycle, and effect such operations as adding fresh or recovered water, soap and low temperature or high temperature steam.

At the end of the washing cycle, the programme card closes switch S10 to operate relay RL2. This opens contacts RL2/1 and closes contacts RL2/2, which provide an interlock with other washing units to prevent two machines unloading simultaneously. Provided none of the other machines is unloading, closure of contacts RL2/2 operates relay RL3, which prevents other machines from unloading as will be described.

Thereafter, switch S11 is released (closed) by the card, and operates solenoid SVA1 to extend cover 19, whereupon switch LS3 closes to operate relay RL6. Contacts RL6/1 close to tip the casing 14 forward to the position shown dotted in FIGURE 2, and contacts RL6/2 close to operate solenoid valve SVB1 and raise cover 19.

Thereafter the washing is unloaded rapidly, since the drum still rotates.

Then card 28 allows switch S12 to open, switching motor M to high speed and rapidly ejecting the card.

Consequently, relay B releases, opening contacts $b1$ and $b2$. Relay RL8 is thus released and closes contacts RL8/2 to operate the tip-up hydraulic valve HV2, whereby casing 14 is raised to the vertical position. In the vertical position contacts LS7/1 open to release valve HV2.

Thus the machine finishes in the vertical positon with cover 19 removed.

It should be mentioned that closure of switch S8 to admit fresh water to the machine will have reset valves V1 and V3 by operating a solenoid valve SVD.

Valve SVC is energised upon the casing reaching the vertical position by closure of contacts LS7/2. If a fresh load has been put into hopper 11 and another card inserted, the cycle will automatically repeat, flaps 25 being opened as before owing to button 29 having been depressed. Otherwise, operation of valve SVC will have no effect on the flaps, but will stop the drum motor through valve V3.

The above-mentioned interlock with the other washing units is provided firstly by the corresponding relays RL3 in the other units being operable to open contacts RL3/1 in the operating circuit of relay 3, so that if other machines are unloading, relay RL3 will not operate, and the card feed motor M will stop upon opening of contacts RL2/1 by operation of relay RL2. On the other hand, if no other machines are unloading, relay RL3 operates and opens corresponding contacts RL3 in all the other machines.

Thus overloading of drying equipment in a laundry may be avoided.

Figure 6C:
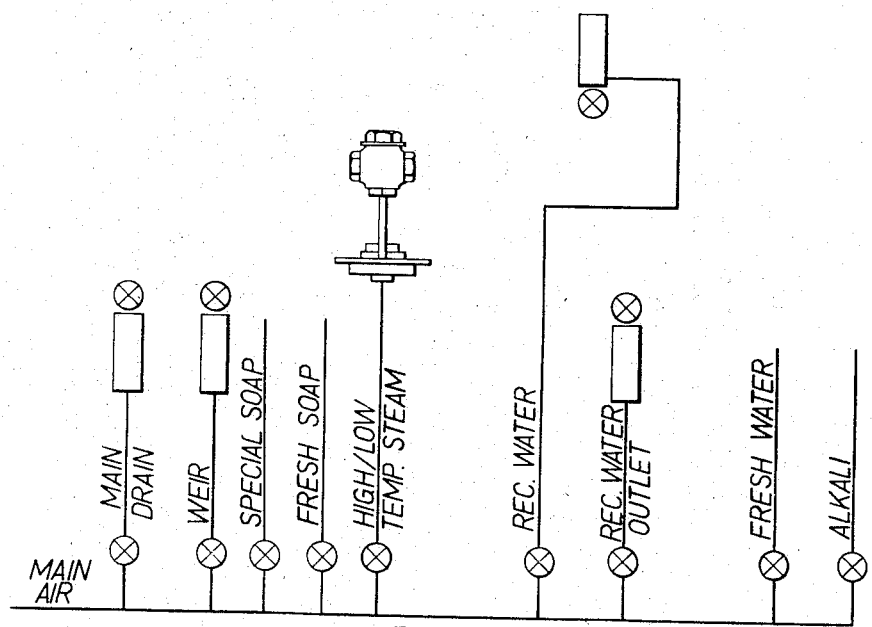

FIGURE 6C illustrates the pneumatic circuits by which the washing cycle is effected.

What is claimed is:

1. A washing machine comprising a base, a support, a drum mounted on the support for rotation about the drum axis, and two pivot means by means of which the support is arranged to be pivotably mounted on said base for pivotal movement between first and second positions in which the drum axis is substantially vertical and substantially horizontal respectively through a third position intermediate said first and second positions, said pivot means comprising a first pivot means on which the support pivots between said first and third positions and a second pivot means on which the support pivots between said second and third positions.

2. A washing machine as claimed in claim 1 and further comprising jack means exerting a leverage about the respective pivot means between said base and said support, the leverage of said jack means about said second pivot means being greater than about said first pivot means.

3. A washing machine as claimed in claim 1 and further comprising a third pivot means by means of which the support is arranged to be pivotally mounted on said base for pivotal movement between said second position and a fourth position, remote from said first and third positions, in which fourth position the drum axis is beyond the horizontal position.

4. A washing machine as claimed in claim 3 and further comprising jack means exerting a leverage about the respective pivot means between said base and said support, the leverage of said jack means about said second pivot means being greater than about said first pivot means and being greater about said third pivot means than about said second pivot means.

5. A washing machine as claimed in claim 4 wherein said second and third pivot means are both arranged to support said support in said second position.

6. A washing machine as claimed in claim 1 and comprising a control station having means to receive a programme card, sensing means to sense the card to determine a washing programme, means to feed the card to said sensing means at a first speed, means to feed the card past the sensing means at a second, slower, speed during the sensing of the card by the sensing means, and means to eject the card at a speed faster than said second speed upon termination.

7. A washing machine as claimed in claim 6 wherein the control station has means to hold a further programme card in readiness for a following washing programme, and means to automatically commence feeding the card past the sensing means upon termination of the first-mentioned washing programme.

References Cited

UNITED STATES PATENTS

| Re. 23,727 | 10/1953 | Miller | 68—210 X |
| 1,904,099 | 4/1933 | Stramaglia et al. | 68—25 |
| 3,031,590 | 4/1962 | Johnson et al. | 68—12 X |
| 3,058,330 | 10/1962 | Grantham | 68—210 X |
| 3,116,903 | 1/1964 | Grantham | 68—210 X |

FOREIGN PATENTS 594,490   6/1959   Italy.

WILLIAM I. PRICE, *Primary Examiner.*